United States Patent [19]

Harvey et al.

[11] Patent Number: 5,274,659
[45] Date of Patent: Dec. 28, 1993

[54] HARMONICALLY MODE-LOCKED LASER

[75] Inventors: George T. Harvey, Princeton; Linn F. Mollenauer, Colts Neck, both of N.J.

[73] Assignee: AT&T Bell Laboratories, Murray Hill, N.J.

[21] Appl. No.: 860,526

[22] Filed: Mar. 30, 1992

Related U.S. Application Data

[63] Continuation-in-part of Ser. No. 835,813, Feb. 18, 1992, Pat. No. 5,212,711.

[51] Int. Cl.⁵ .......................... H01S 3/083; H01S 3/10
[52] U.S. Cl. ........................ 372/94; 372/18; 372/25; 372/92
[58] Field of Search .................. 372/94, 18, 20, 25, 372/26, 6, 92, 100, 34

[56] References Cited

U.S. PATENT DOCUMENTS 5,017,806  5/1991  Edelstein .................. 372/94

OTHER PUBLICATIONS

"Fabrication and Characterization of Low-Loss Optical Fibers Containing Rare-Earth Ions," S. B. Poole et al., *Journal of Lightwave Technology*, vol. LT-4, No. 7, Jul. 1986, pp. 870-875.

*Primary Examiner*—James W. Davie
*Attorney, Agent, or Firm*—Roderick B. Anderson

[57] ABSTRACT

In a harmonically mode-locked laser, first (33) and second (34) optical beams are derived from the laser optical path which are directed, respectively, through first and second optical filters (37) having optical pass-bands (40, 41) that are displaced in frequency but which intersect at approximately the center frequency ($f_c$) of operation of the laser. The free spectral range of a Fabry-Perot optical resonator (24) in the laser ring is deviated from a frequency exactly equal to the pulse repetition rate of the laser by a frequency (df) sufficient to permit changes in the length of the optical path to be manifested as changes in the wavelength of light transmitted along the optical path. Apparatus (39, 40, 42) for detecting the difference of intensity of light passing through the first and second filters can then be used to generate a signal proportional to the difference of intensity of such light for the purpose of adjusting, by length adjusting apparatus (43), the length of the optical path to compensate for spurious temperature-induced length variations.

16 Claims, 4 Drawing Sheets

HARMONICALLY MODE-LOCKED LASER

This is a continuation-in-part of the patent application of G. T. Harvey and L. F. Mollenauer, Ser. No. 07/835,813, filed Feb. 18, 1992, now U.S. Pat. No. 5,212,711, granted May 18, 1993, hereby incorporated herein by reference.

TECHNICAL FIELD

This invention relates to optical pulse generators and, more particularly, to harmonically mode-locked ring lasers.

BACKGROUND OF THE INVENTION

The parent application of Harvey et al. describes the advantages of using a harmonically mode-locked laser as an optical pulse source, particularly a source of pulses that can be used for soliton transmission. Solitons are optical pulses having a particular shape, width and energy that causes certain nonlinear effects of a single-mode fiber to compensate for the effects of chromatic dispersion in the fiber. As a consequence, each pulse can propagate great distances on the single-mode fiber while maintaining its shape and pulse width. Among other advantages of soliton transmission is the practicality of using erbium amplifiers, rather than repeaters, for amplifying the transmitted signal, and the fact that soliton transmission permits wavelength division multiplexing and polarization division multiplexing, which can further increase transmission line capacity.

The harmonically mode-locked laser described in the Harvey et al. application uses an optical pump for exciting an erbium fiber amplifier located in a closed-loop resonator path. An electrooptic modulator in the path is driven at an appropriate frequency to form the laser light into pulses having a repetition rate harmonically related to the frequency spacing between adjacent resonant modes of the closed-loop resonator path. The improvement of the Harvey et al. application is characterized in that the optical path includes a Fabry-Perot optical resonator having a free spectral range substantially equal to the pulse repetition rate of optical pulses in the ring laser. The Fabry-Perot resonator tends to equalize the energy, shape, and width of the pulses taken as the output. Unfortunately, we have found that even with this improvement, the harmonically mode-locked laser can manifest instabilities in its pulsed output.

SUMMARY OF THE INVENTION

We have determined that the instabilities of the Harvey et al. laser are caused by small length changes in the closed-loop path resulting from temperature fluctuations. For combating this problem, we derive first and second optical beams from the optical path which are directed, respectively, through first and second optical filters having optical pass-bands that are displaced in frequency but which intersect at approximately the center frequency of operation of the laser. As will be explained later, the free spectral range of the Fabry-Perot optical resonator is deviated from a frequency exactly equal to the pulse repetition rate by a frequency sufficient to permit changes in the length of the optical path to be manifested as changes in the wavelength of light transmitted along the optical path. Apparatus for detecting the difference of intensity of light passing through the first and second filters can then be used to generate a signal proportional to the difference of intensity of such light for the purpose of adjusting the length of the optical path to compensate for spurious temperature-induced length variations.

In accordance with one embodiment of the invention, the adjustment of the length of the optical path is made by directing current proportional to the difference of light intensities through a resistor film that surrounds part of the optical fiber of the optical path. Changes in current can be used to change the temperature, and thus the optical length of the optical fiber, thereby to compensate for spurious length changes. This feature of the invention can also be used in apparatus other than harmonically mode-locked lasers where small but precisely determined length adjustments are to be made, such as in phase shifters.

These and other objects, features, and advantages of the invention will be better understood from a consideration of the following detailed description taken in conjunction with the accompanying drawing.

DETAILED DESCRIPTION

Figure 1:
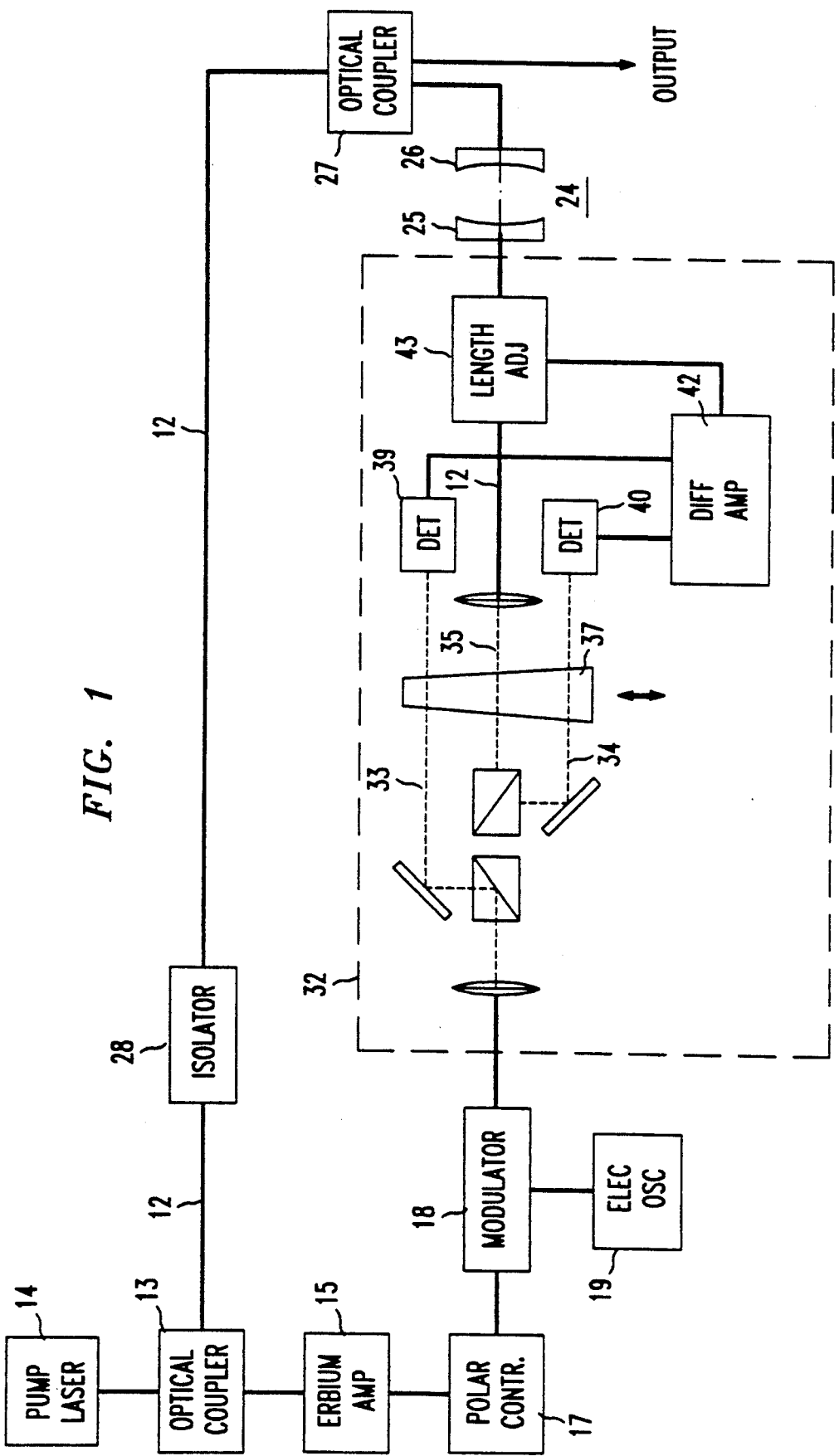
FIG. 1 is a schematic illustration of a harmonically mode-locked laser in accordance with an illustrative embodiment of the invention.

The drawings are not to scale, are simplified, and in some cases are distorted to facilitate a working understanding of the invention. Referring now to FIG. 1, there is shown schematically a harmonically mode-locked ring laser in accordance with an illustrative embodiment of the invention in which part of a closed-loop optical transmission path is defined by a single-mode optical fiber 12. ("Single mode" refers to the capacity of the fiber to transmit light in only a single transverse mode; as will be seen later, the fiber supports many longitudinal modes.) An optical coupler 13 directs optical energy from a pump laser 14 to an erbium fiber amplifier 15. The erbium fiber amplifier 15 is an active laser medium of the type described, for example, in the paper, "Fabrication and Characterization of Low-Loss Optical Fibers Containing Rare-Earth Ions," S. B. Poole et al., *Journal of Lightwave Technology*, Vol. LT-4, No. 7, July 1986, pp. 870-875, which comprises an erbium-doped length of optical fiber which amplifies light along its optical fiber path when appropriately pumped by energy from the pump laser 14. As is known, various other kinds of active laser media can be used for amplifying light in a harmonically mode-locked ring laser. The light energy propagates around the closed loop defined by the optical transmission path, with a polarization controller 17 being used to compensate for polarization changes in the ring, as is known.

Figure 2:
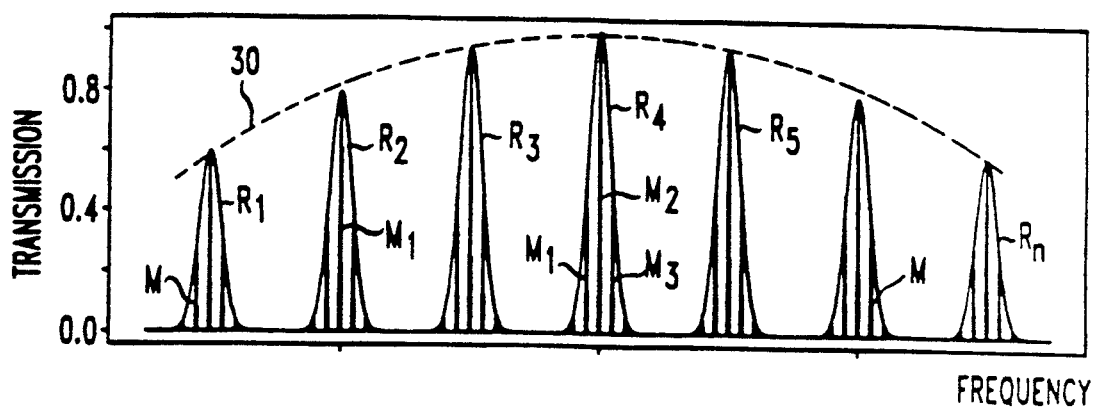
FIGS. 2-5 illustrate various resonant modes in the Fabry-Perot resonator and the closed-loop ring of FIG. 1.

A modulator 18 modulates the intensity of the coherent light so as to make it in the form of a succession of pulses. It may typically be a known Mach-Zehnder lithium niobate modulator driven at a frequency typically in the gigahertz range by an electronic oscillator 19 to form optical pulses having a corresponding repetition rate. The frequency of modulation is chosen such that the pulse repetition rate has a period substantially equal to the transit time of light pulses around the optical path divided by an integer, or $$T = t/N \quad (1)$$

where T is the period of the optical pulses, t is the transit time of light pulses around the closed-loop path, and N is an integer. Referring to FIG. 2, the closed-loop path has a succession of resonant frequency modes M. It can be shown that compliance with equation (1) results in a pulse repetition rate $f_2$ given approximately by $$f_2 = Nf_1 \quad (2)$$

where $f_1$ is the frequency separation between adjacent resonant ring modes M, such as the separation between $M_1$ and $M_2$. Frequency $f_1$ is given by $$f_1 = c/nl \quad (3)$$

where c is the speed of light, n is the refractive index of refraction of the optical fiber, and 1 is the length of the closed-loop path or ring of the laser.

As described in the Harvey et al. application, part of the laser ring is defined by a Fabry-Perot resonator 24 comprising partially transparent mirrors 25 and 26, which has the effect of equalizing the amplitude of the output pulses. A portion of the pulse train circulating in the ring is removed from the ring by an output coupler 27 and is transmitted as output pulses as shown. These pulses are sufficiently close to being hyperbolic secant squared pulses to be used as solitons for transmission on a single-mode optical fiber to obtain the known benefits of soliton transmission of information. An isolator 28 is included in the ring to direct propagation in the ring the counterclockwise direction as has been described.

The Fabry-Perot resonator defines a multiplicity of equally spaced resonant modes $R_1 \ldots R_n$, as shown in FIG. 2, and has a free spectral range (FSR) defined as the frequency separation of two adjacent modes, e.g., the center-to-center separation of $R_2$ and $R_3$. The FSR is also given by:

$$FSR = \frac{c}{2d} \quad (4)$$

where c is the speed of light in the resonator and d is the optical path length between the opposite mirrors 25 and 26.

In accordance with the Harvey et al. application, the resonator 24 is constructed so as to have an FSR that is substantially equal to the pulse repetition rate $f_2$ of the ring laser or $$FSR = f_2 \quad (5)$$

With this condition met, the Fabry-Perot resonator equalizes the energy carried by the successive pulses, thereby equalizing the pulse amplitude of the generated pulse train. The ring laser modes M nearest coincidence with the resonant peaks of the resonator modes R produce laser emission of radiation, while competing modes are suppressed. Equations (4) and (5) say that the round trip time of light in the resonator 24 corresponds to the desired pulse period.

The envelope 30 of the Fabry-Perot modes represents the pass-band of the Fabry-Perot resonator 24 with mode $R_4$ at the center frequency. The ordinate of FIG. 2 measures the fraction of optical intensity passed by the resonator at the various frequencies.

Figure 3:
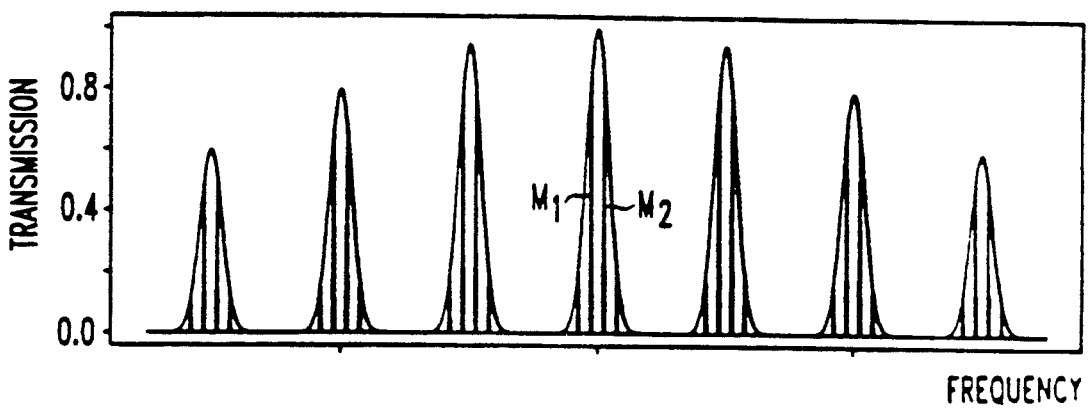

While the addition of an internal Fabry-Perot optical resonator stabilizes the operation of the harmonically mode-locked ring laser by suppressing unwanted modes of the ring, we have found that the laser still sometimes manifests instabilities. FIG. 3 illustrates one cause of these instabilities. If the ring is on the order of twenty meters long, a temperature change of only 0.005 degrees Centigrade will change the length of the ring by a wavelength. Thus, it is quite possible that modes $M_1$ and $M_2$ will be shifted in frequency to see a substantially equal loss in the Fabry-Perot resonator. Both of these modes stimulate laser action and create mode beatings which in turn causes an amplitude variation in the output pulses.

Figure 4:
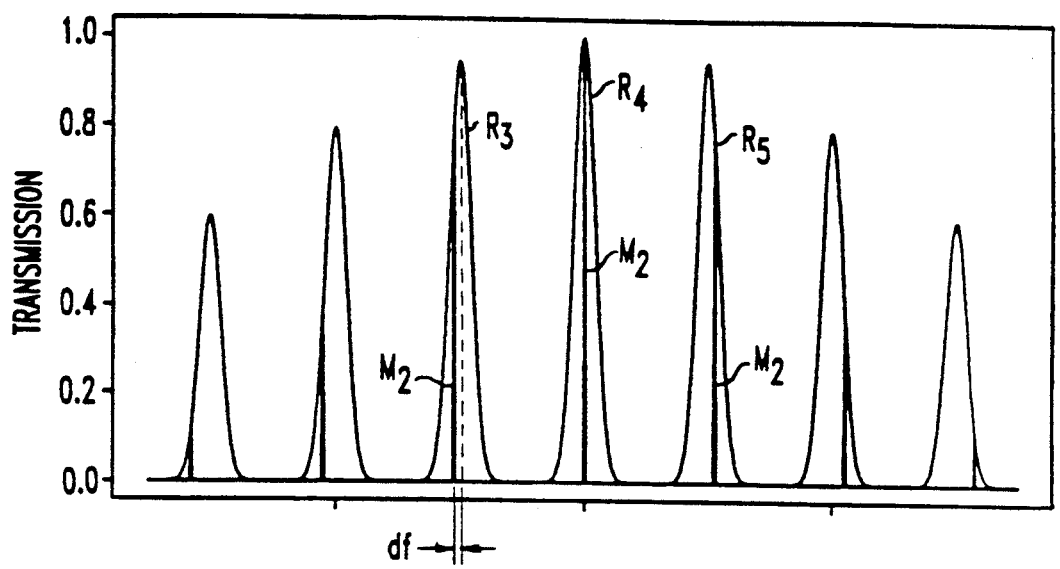

In accordance with the invention, the Fabry-Perot resonator 24 is detuned or deviated slightly from its optimum frequency for the purpose of permitting an error signal to be generated that can be used to compensate for small changes in the length of the closed-loop ring of the laser. Equations (2) and (5) indicate that the FSR should be equal to an integral number of the separation distance between adjacent ring modes M and, with this being true, one of the ring modes M is located in the center of each of the Fabry-Perot modes R as shown in FIG. 2. In FIG. 4, the Fabry-Perot resonator has been detuned such that the FSR deviates from a frequency exactly equal to the pulse repetition rate by a frequency equal to df.

Figure 5:
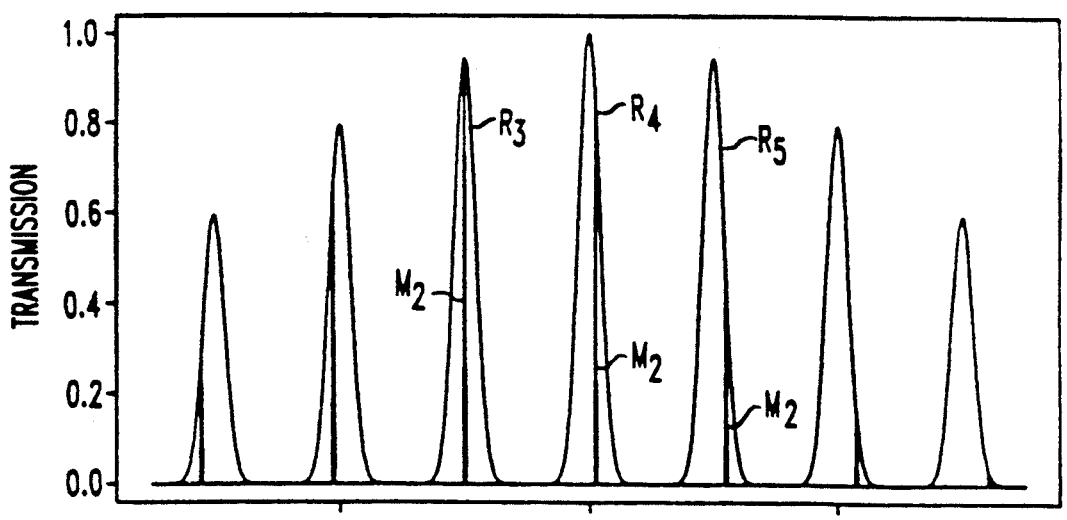

For purposes of simplicity, FIG. 4 shows only the ring modes corresponding to $M_2$ of FIG. 2 (within the various Fabry-Perot modes R of FIG. 4). The detuning of the Fabry-Perot resonator permits a small change in the length of the ring to be manifested by a detectably large change in the wavelength or frequency of the output light. The reason for this is illustrated in FIG. 5. If a small length change causes the ring mode $M_2$ of Fabry-Perot mode $R_4$ to move slightly to the right, the transmission intensity at that frequency is greatly reduced, whereas the same change moves the corresponding ring mode $M_2$ of Fabry-Perot mode $R_3$ to a region of maximum output. The consequence of this is that the small change results in a large increase in the intensity of frequencies defined by mode $R_3$ and a reduction of those in mode $R_4$. By the same token, a change in ring length that would have caused $M_2$ to move in the opposite direction will cause a predominant shift of frequencies to those defined by Fabry-Perot resonant mode $R_5$. Thus, in FIG. 5, movements of $M_2$ within resonator $R_4$ to the right cause the light intensity in mode $R_3$ to increase and movements of $M_2$ within $R_4$ to the left cause the intensity of light in $R_5$ to increase relative to the other Fabry-Perot modes R. Small changes in optical path length are thereby manifested as detectable changes in output frequency.

Referring again to FIG. 1, there is shown apparatus 32 for detecting a change of frequency of the light transmitted in the optical ring and automatically making the length adjustment to the ring in response to such frequency deviation. Beam splitters are used for deriving from the optical path two optical beams 33 and 34. A beam portion 35 constitutes part of the optical path of the ring. The three beam portions 33, 34 and 35 are all directed through a wedged etalon 37, which may be a body of quartz tapered as shown, such that beam 33 is transmitted through a relatively thinner portion of the etalon, while beam 34 is transmitted through a relatively thicker portion. By using a wedged etalon and moving the etalon up or down as shown by the arrow, the frequencies of the etalon transmission peaks corresponding to all three beams can be changed simultaneously and at the same rate.

Figure 6:
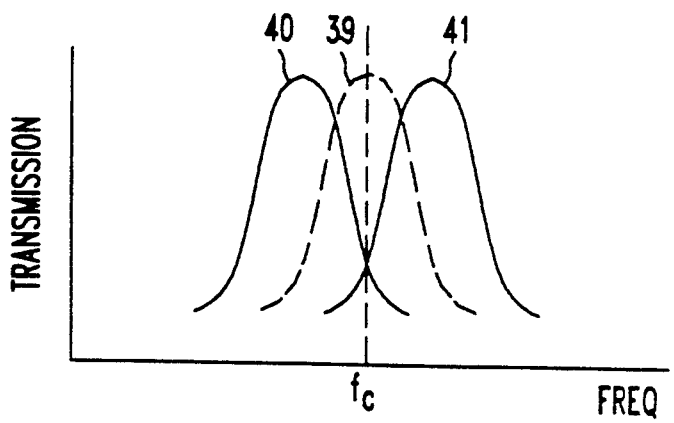
FIG. 6 is a view showing the pass-bands of filter portions of the apparatus of FIG. 1.

Referring to FIG. 6, the etalon constitutes an optical filter for each of the three beams, curve 39 representing the optical pass-band for beam 35, curve 40 representing the pass-band for optical beam 34, and curve 41 being the pass-band for beam 33. If one were to move the etalon 37 up or down, one would move the center frequency $f_c$ pass-band 39 to the right or left. With the etalon taper constant and the beams 33 and 34 symmetrically disposed around beam 35, then curves 40 and 41 will be symmetrically disposed around curve 39, even if frequency $f_c$ is shifted. The intersection of pass-bands 40 and 41 at $f_c$ indicates that they are symmetrical with respect to $f_c$.

The intensities of beams 33 and 34 are detected by detectors 39 and 40, which may be conventional photodetectors that convert optical intensity to electrical signal amplitude. Since pass-bands 40 and 41 are frequency dependent, changes in optical frequency are manifested by changes of optical intensity detected by detectors 39 and 40. The outputs of the detectors are directed to a differential amplifier 42 which generates a voltage proportional to the difference in output signal amplitude detected by detectors 39 and 40. The differential amplifier output is directed to a length adjustment device 43 which adjusts the length of the ring laser optical path as a function of such output.

Figure 7:
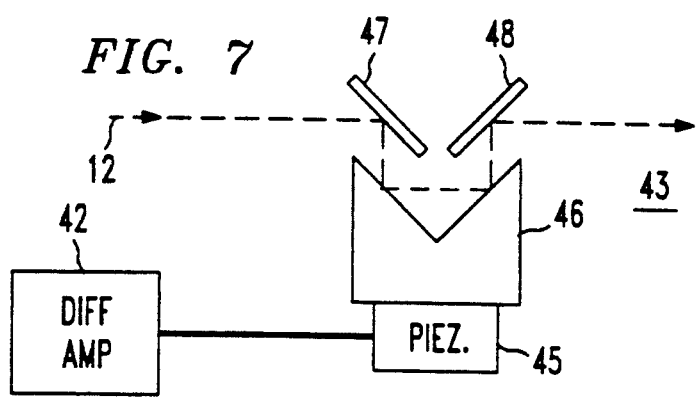
FIG. 7 is a schematic illustration of length adjustment apparatus that can be used in the circuit of FIG. 1.

Referring to FIG. 7, the length adjustment device 43 may comprise a piezoelectric stack 45 coupled to a corner reflector 46. Light from the optical path 12 is directed to a mirror 47, to the corner reflector 46, to a mirror 48, and back to the optical path 12. Voltage from the differential amplifier 42 in one direction will push the corner reflector toward the mirrors 47 and 48, thus shortening the optical path, while voltage in another direction will lengthen the path by an amount proportional to the voltage from the differential amplifier. The purpose of the length adjustment is of course to compensate for spurious length changes due, for example, to thermal effects. The various parameters to be used can be determined mathematically, but it is more practical to determine them experimentally; that is, it is generally more practical to calibrate experimentally the length adjustment required for different inputs from the differential amplifier 42.

From the foregoing, it can be appreciated that detuning the Fabry-Perot resonator 24 can be quite effective in generating a difference voltage from differential amplifier 42 as needed for compensating for spurious length changes. That is, as shown in FIG. 5, a small length change gives a large shift in intensity from resonator mode R4 to R3, which in turn is responsible for generating a significant difference voltage for making a length adjustment through device 43 (FIG. 1). In the absence of the detuning depicted in FIG. 5, the length change manifested in FIG. 3 by the shift in ring modes M could not be expected to generate a significant difference signal that could be practical for making a length adjustment. The detuning frequency df of FIG. 4 could be determined mathematically but is easier to determine it experimentally. That is, it should be sufficiently large to give the mode shifting illustrated in FIG. 6, but it should also be smaller than the frequency separation $f_1$ of adjacent ring modes M of FIG. 2.

Figure 8:
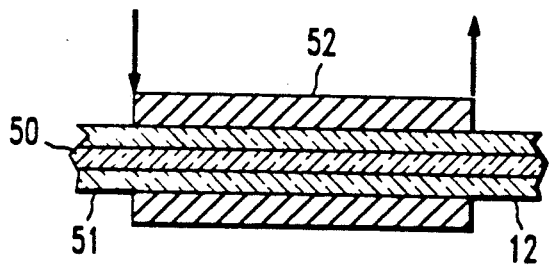
FIG. 8 is a schematic view of alternative length adjustment apparatus that may be used in FIG. 1.

FIG. 8 shows an alternative device that can be used as the length adjuster 43 of FIG. 1. The device comprises a portion of the single-mode optical fiber 12 which is shown as comprising a core layer 50 within a clad layer 51. Surrounding the clad layer is a resistive layer 52 which conducts current as shown by the arrow. The resistive layer 52 may, for example, be tin or similar resistive metal having a thickness of about twenty microns through which current is conducted during operation. Voltage from the differential amplifier 42 either reduces the current through the resistor to reduce the temperature of the optical fiber, or increases the current through it so as to increase the temperature of the optical fiber. The changes in temperature result in slight changes in the length of the optical fiber portion surrounded by the resistor 52 to give the required length adjustment.

We have noted in our experiments that the length adjuster of FIG. 8 is generally preferable to the length adjuster of FIG. 7. The coating 52 can be made very accurately and the changes in the optical fiber length are controllable with a great deal of precision. We find that a change in temperature of 0.006 degrees Centigrade shifts the length of a fifteen meter optical fiber portion by about one wavelength. Thus, it is possible to get larger and more precise length changes with the FIG. 8 embodiment than the FIG. 7 embodiment.

Figure 9:
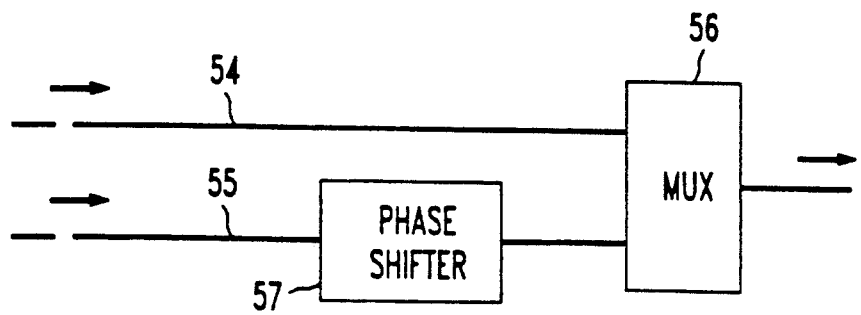
FIG. 9 is a schematic view of a phase shifter in accordance with another embodiment of the invention.

We have also realized that the device of FIG. 8, because of its advantages, may be beneficial in circuits other than that shown in FIG. 1. The FIG. 8 embodiment, for example, may be used as an optical phase shifter. Referring to FIG. 9, when it is desirable to multiplex optical pulse trains from transmission lines 54 and 55, it is often desirable to adjust their relative phases prior to multiplexing by a multiplexer 56. For this purpose, a phase shifter 57 in one of the lines can be used to adjust finely the phase of the pulses in lines 55. The device of FIG. 8 is admirably suited to this since small adjustment of the current directed through resistive film 52 will make slight adjustments of the effective length of the optical fiber portion and thus of the phase shift provided by the fiber portion. A multiplexer interleaves the pulses from the two transmission paths and, for this reason, it is important that the relative phases of the two sets of pulses be controllable. The phase shifter can also be used for the purpose of adjusting the phase of optical clock circuits, as is useful in many optical circuits. Phase shifters are also useful in analog circuits as well as circuits using pulse signals.

As was mentioned in the parent Harvey et al. application, a ring laser embodying the invention may be operated at a wavelength typically of 1.555 microns. One hundred milliwatts of pump power may be applied at a wavelength of 1.48 microns and the total length of the closed-loop ring may be twenty meters. The modulator 18 may be driven at 2.5 gigahertz. The frequency separation $f_1$ between ring modes M of FIG. 2 may typically be seven megahertz and the FSR or the center-to-center spacing of Fabry-Perot modes R may be 2.5 gigahertz. The width of each Fabry-Perot mode R may be sixteen megahertz and the detuning frequency df of FIG. 4 may be one hundred kilohertz. The bandwidths of the wedged etalon portions illustrated in FIG. 6 may each be about sixty gigahertz. Various other parameters of the circuit of FIG. 1 may be as described in the parent application.

Various modifications and embodiments other than those specifically described may be made by those skilled in the art without departing from the spirit and scope of the invention.

We claim:

1. A harmonically mode-locked ring laser comprising:

means defining a resonant optical path;

an active laser medium for emitting coherent light to be transmitted along the optical path;

means included in the optical path for causing the light to propagate along the path as a succession of pulses having a substantially uniform repetition rate at a sub-optic frequency and having a period substantially equal to the transit time of the light pulses in the optical path divided by an integer;

the optical path including a Fabry-Perot optical resonator having a free spectral range substantially equal to said pulse repetition rate;

means for deriving first and second optical beams from the optical path;

means for directing the first and second beams respectively through first and second optical filters;

the first and second filters having optical pass-bands that are displaced in frequency and which intersect at a frequency $f_c$;

means for detecting the difference of intensity of light passing through the first and second optical filters and for using the difference to adjust the length of the optical path;

the free spectral range of the Fabry-Perot optical resonator deviating from a frequency exactly equal to the pulse repetition rate by a frequency sufficient to permit changes in the length of the optical path to be manifested as changes in wavelength of light transmitted along the optical path.

2. The laser of claim 1 wherein:

the resonant optical path has a plurality of resonant ring modes each separated by a frequency $f_2$;

and the free spectral range of the Fabry-Perot resonator deviates from a frequency exactly equal to the pulse repetition rate by a frequency df that is less than $f_2$.

3. The laser of claim 1 wherein:

the first and second filters comprise part of a single wedged etalon.

4. The laser of claim 3 wherein:

a central portion of the wedged etalon constitutes part of said optical path, a relatively thick portion of the etalon constitutes the first filter and a relatively thin portion of the etalon constitutes the second filter.

5. The laser of claim 4 further comprising:

means for moving the etalon transversely with respect to the optical path.

6. The laser of claim 5 wherein:

the first and second optical beams and the optical path all traverse the wedged etalon along substantially parallel paths.

7. The laser of claim 1 wherein:

the means for detecting light intensity differences and using the differences to adjust length comprises photodetectors in the paths of the first and second beams, the outputs of the photodetectors are connected to a differential amplifier, and the output of the differential amplifier is connected to apparatus for adjusting the length of the optical path.

8. The laser of claim 1 wherein:

the optical path defining means comprises an optical fiber;

and the means for adjusting the length of the optical path comprises means for selectively resistively heating part of the optical fiber.

9. The laser of claim 8 wherein:

said part of the optical fiber comprises a single-mode optical fiber coated with film of resistive material;

and the selective heating means comprises means for directing current through the resistive metal film.

10. The laser of claim 1 wherein:

the means for causing light to propagate as a succession of pulses comprises an optical modulator for modulating optical transmission in the optical path at a rate equal to the pulse repetition rate;

and the optical path describes a closed loop having a transit time substantially equal to an integral number of periods of said pulse repetition rate.

11. The laser of claim 1 wherein:

the active laser medium comprises an erbium doped single-mode optical fiber portion;

and the succession of pulses are reached sufficiently close to being of a hyperbolic secant squared shape to be used as a source of solitons.

12. An optical pulse generator comprising: means for defining an optical transmission path; an active laser medium included in the transmission path; means for causing the active medium to emit coherent light of a predetermined frequency; means included in the optical transmission path for causing the emitted light to propagate along the transmission path as a succession of pulses having a substantially uniform pulse repetition rate at a sub-optic frequency; the length of the path being substantially equal to an integral number of periods of said pulse repetition rate; and means for removing a portion of said pulses from said optical transmission path; wherein the improvement is characterized in that:

said optical transmission path includes an optical resonator having equally spaced resonances, adjacent resonances being separated by a frequency substantially equal to said pulse repetition rate;

means are provided for deriving first and second optical beams from said optical path and for directing the first and second optical beams, respectively, through first and second optical filters having optical pass-bands that are displaced in frequency and which intersect at a frequency $f_c$;

and means are provided for detecting the difference of intensity of light passing through the first and second optical filters and for using the difference to adjust the length of the optical transmission path.

13. The pulse generator of claim 12 further characterized in that:

the optical path is a closed-loop path, a major part of which is defined by a single-mode optical fiber.

14. The pulse generator of claim 12 further characterized in that:

the optical resonator is a Fabry-Perot resonator.

15. The pulse generator of claim 14 further characterized in that:

the optical transmission path has a plurality of resonant modes each separated by a frequency $f_1$;

and the Fabry-Perot resonator has a free spectral range that deviates from a frequency exactly equal to the pulse repetition rate by a frequency that is less than $f_1$.

16. The pulse generator of claim 12 further characterized in that:

the first and second filters comprise part of a single wedged etalon;

and means are included for moving the etalon transversely with respect to the optical transmission path.

* * * * *